Figure 4:
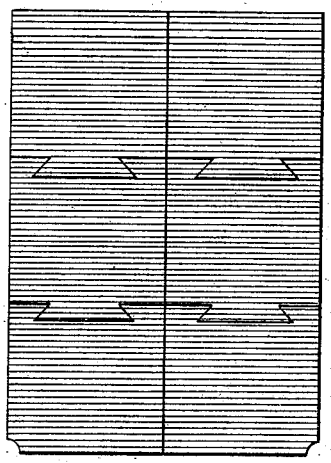
Figure 4:
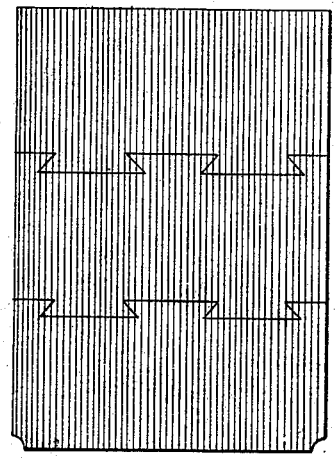
Figure 4:
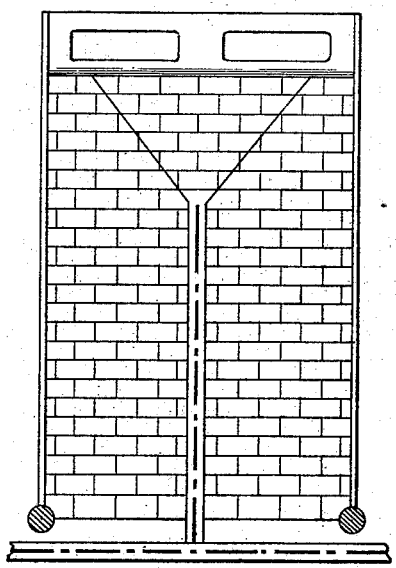
Figure 4:
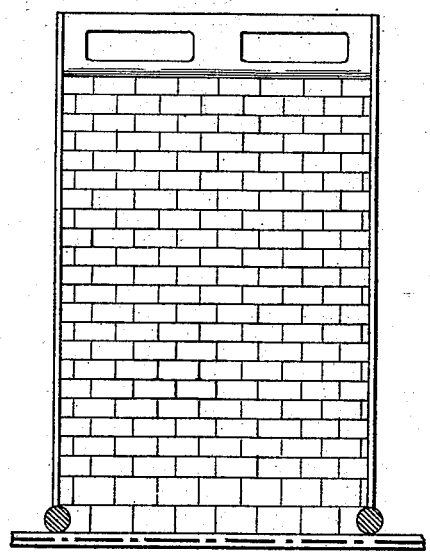

(No Model.) 2 Sheets—Sheet 1.
D. GAUSSEN.
Manufacture of Vulcanized India Rubber, &c.
No. 239,159. Patented March 22, 1881.
Fig. 1
Fig. 2.
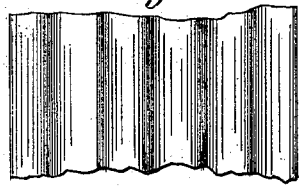
Fig. 7.
Fig. 3.
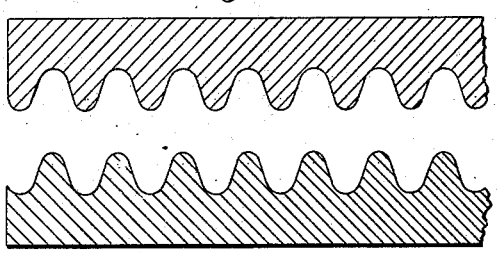
Fig. 11.
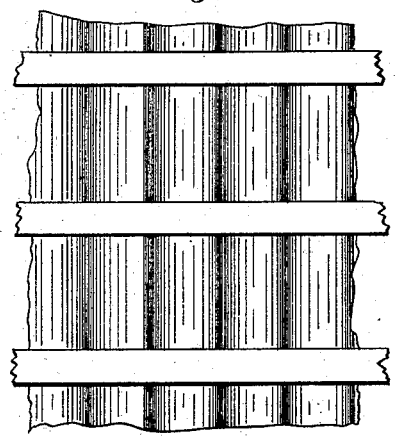
Fig. 8.
Fig. 5.
Fig. 6.
Fig. 9.
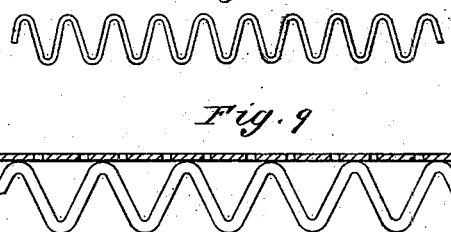
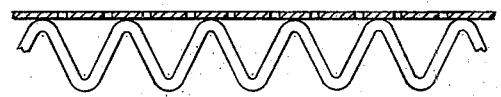
Fig. 10.
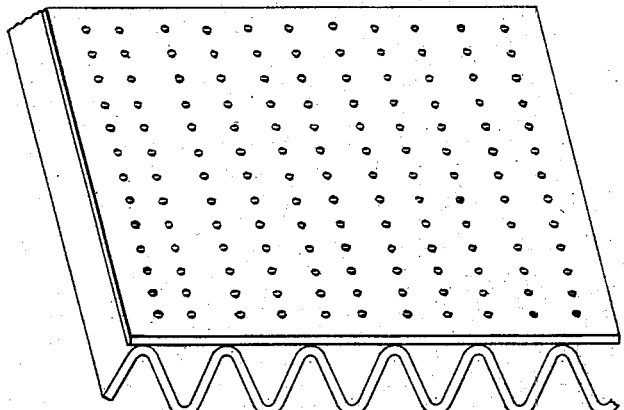
Fig. 12.
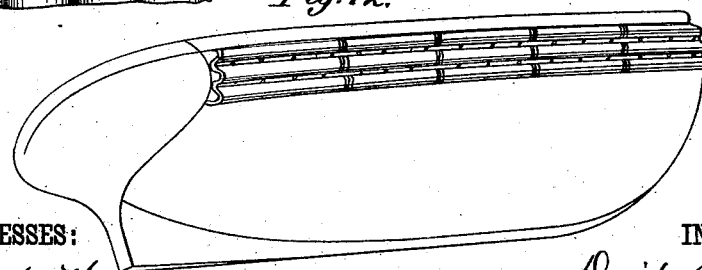
WITNESSES:
W. W. Hollingsworth
John C. Kennon
INVENTOR:
David Gaussen
BY
ATTORNEYS.

(No Model.) 2 Sheets—Sheet 2.

D. GAUSSEN.
Manufacture of Vulcanized India Rubber, &c.

No. 239,159. Patented March 22, 1881.

*Fig. 13.* *Fig. 14.*

WITNESSES: INVENTOR:
David Gaussen
BY
ATTORNEYS.

United States Patent Office.

DAVID GAUSSEN, OF BROUGHTON HALL, LECHLADE, COUNTY OF GLOUCESTER, ENGLAND.

MANUFACTURE OF VULCANIZED INDIA-RUBBER, &c.

SPECIFICATION forming part of Letters Patent No. 239,159, dated March 22, 1881.

Application filed January 17, 1881. (No model.)

*To all whom it may concern:*

Be it known that I, DAVID GAUSSEN, of Broughton Hall, Lechlade, in the county of Gloucester, England, have invented a new and Improved Manufacture of Vulcanized India-Rubber and other similar Elastic Non-Absorbent Material; and I do hereby declare that the following is a full, clear, and exact description of the same, reference being had to the accompanying drawings, forming part of this specification.

My invention relates to the manufacture of sheets of vulcanized india-rubber and of india-rubber with the various materials used in combination therewith in the manufacture of door-mats and such like things, the particulars of which are set out in the specification of a patent granted to Thomas Hancock, and dated 18th March, 1846, No. 11,135, these compounds being now well known in the rubber trade, and which, for greater brevity, are hereinafter termed "rubber."

My invention consists in corrugating such sheets on both sides, so as to produce a series of hollow arches or hollow semi-cylindrical formations, such as those usually formed by the corrugation of sheets of galvanized iron, the grooves on the one side being alternate with those on the opposite side of the same sheet, that which is a convexity on one side being itself a concavity on the other side, and on one and the same side a convexity or ridge being followed by a concavity, and a concavity by a convexity. Such corrugations or arches may be of various forms in profile, according to the purpose for which the sheets are intended. Besides being corrugated, the sheets may or may not be perforated over all or any portion of the corrugated surface, according to the nature of their application.

The object of my invention is, from a comparatively light and thin uncorrugated and unvulcanized sheet of rubber, by means of such corrugations, (which are rendered permanent by subsequent vulcanization,) to produce a mat, mattress, or such like article of any desired depth of pattern, affording to a distributed surface pressure as much, or nearly as much, resisting power as a solid sheet of rubber of equal thickness would give, at the same time affording greatly-increased surface elasticity, with thorough ventilation, dryness, and drainage.

My object is also, by a simpler, and consequently more economical, process of manufacture, to produce seat-covers, mattresses, beds, or such like articles, which articles it has heretofore been usual to inflate or distend by means of air and water, both of which my invention supersedes, with the manifest advantages, in addition to those of economy and simplicity of manufacture, (already referred to,) that such mattresses, beds, seats, and such like things are not exposed to the risks of becoming damaged and useless from puncture or such like injury, and also that such mattresses, &c., afford thorough and proper healthful ventilation of surface to the part of the body resting upon them, while in the case of air-mattresses, cushions, &c., or of water-beds, on the contrary, the parts of the body in contact with and resting thereon impart their impress to such air-mattresses, cushions, or water-beds, thereby excluding the action of the atmosphere from communicating with such parts of the body so in contact with and resting upon such air-mattress or water-bed.

In order that my invention may be more readily understood, I have illustrated it in the accompanying drawings, in which—

Figures 1 and 2 are a plan and cross-section, respectively, of a portion of a sheet of rubber corrugated with one form of corrugation. Figs. 3 and 4 are similar views, representing, respectively, other forms of corrugation. These views are given merely as examples by way of illustration of my designation of the corrugation of rubber, because the word "corrugated" has been heretofore current in the rubber trade, but with an application to other and entirely dissimilar things, which might, with correctness, have been termed "serration" or "roughening of surface;" but it is obvious that the form or pattern of my corrugations may be varied at pleasure, as in Figs. 5 and 6, which are cross-sections representing in profile other forms of such corrugation. Fig. 7 is a cross-section, showing the kind of dies in which the rubber is corrugated.

The material is adapted for various useful purposes, such as the following: mats for wells at doors of houses and for ships at cabin-doors; mats for foot-boards of carriages, railway-carriages, especially smoking-compartments, and for floors of boats, &c.; carpets for the floors of post-office railway-vans, relieving the clerks and letter-sorters of much jar and vibration, which is now most injurious to them in long journeys, during which they are occupied in a standing position; also, for smoking-cabins, companion-houses, stairs, deck-houses, &c., of steamers; for tents, bath-rooms, and billiard-rooms, giving an elastic and luxurious tread; corridors of public offices, law-courts, aisles of churches, libraries, concert-rooms, and all other places where absence of noise is desired, &c.; mattresses for horses, cows, and cattle upon transatlantic steamers, in lieu of straw; mattresses for passengers of emigrant and pilgrim ships, and forecastle-bunks of all ships; for soldiers and police in barracks and camps, workhouses, hospitals, prisons, ambulances, operating-beds, invalid-beds, &c.; seat-covers for tram-cars, boats, omnibuses, coachmen's seats on carriages, gun-carriages, dog-carts, and for all seats exposed to wet; linings for horse-boxes of railways or steamers, fever-carts, padded cells of lunatic asylums, guards' vans on railways, furniture-vans, and sides of companion-stairs of steamers; fenders for ships' boats in davits; to hang over gunwales of yachts and yachts' boats; leg-guards for cricket; knee-caps for horses, and housemaids' knee-pads, and for all other such like varied and various purposes.

The following is the method I pursue in carrying out my invention: The pattern of the corrugation for the sheet required having been arrived at by a calculation of the height and number of corrugations to a given area of surface, with the amount of angle and slope to each of such corrugations required to be produced, having regard to the application of the object to be manufactured and the relative degrees of resistance or elasticity which are required from it, metal dies or molds are made accordingly in such form as already illustrated by Fig. 7. The sheet of unvulcanized and uncorrugated rubber is then placed between the two counterpart dies, Fig. 7, subjected to suitable pressure, and then vulcanized according to the method well known in the rubber trade. From one and the same pair of such molds objects of the same number of corrugations, but of different thicknesses of material, may be made by regulating the degrees of proximity to which the counterpart molds shall be allowed to approach to each other under pressure. Thus, for the production of a door-mat, for instance, when it is desirable to make allowance at top and bottom of the mat for wear from friction, and consequently to have greater thickness at those parts, this is accomplished by maintaining a greater distance between the same pair of dies under pressure, the result of which is illustrated in profile by Fig. 8, while on the other hand, in the case of seat-covers and of mattresses, for instance, where wear from friction is not to be provided against and greater elasticity and lightness of material are desired, it is gained by diminishing the regulated intervening space between the same pair of counterpart dies when under pressure.

In the construction of mattresses, beds, seats, and such like things, where a plain upper surface is desired, this is attained by the superaddition to the top of the corrugated sheet of an uncorrugated sheet of perforated rubber, as shown in cross-section and plan, Figs. 9 and 10; and where such mattress or bed or seat is to be used upon the ground the under sheet of corrugation should not be perforated, in order that it may resist dampness from the ground, the requisite ventilation being insured by the perforation of the upper flat sheet resting upon its several open arches or convexities. (See Fig. 10, illustrative of one of such mattresses.) This mattress can be rolled up and easily disposed of and carried. When such mattresses are used in hospitals for operations, and in ambulances, they possess the advantage of being unaffected by blood or other fluids, the use of water at all times restoring their original cleanliness, and as to some parts of such beds actual friction cannot be readily applied, congealed blood or matter can, notwithstanding, be at once removed from such parts by the application of a little of "Condy's Fluid" mixed with water, brushing or sponging over with which will also disinfect such mattresses from infection when they may have been used by fever-patients.

Where it may be desirable to prevent undue lateral extension of the corrugated sheet of rubber when used for objects exposed to friction and heavy weight, an uncorrugated sheet, perforated or unperforated, or strips of rubber crossing the corrugations transversely at certain intervals, may be cemented to the under side of the corrugated sheet, as seen in plan, Fig. 11, and in certain cases of application—such as door-mats—this object may better be effected by inclosing the corrugated sheet with a margin of solid rubber of some plain or ornamental pattern. My corrugated material may also be used for fenders for ships' boats, to diminish the risk of their being stove in against the ship's sides on being lowered for use at sea or otherwise. This I do by cementing a plain unperforated sheet of what is known in the trade as "insertion" rubber over that side of the corrugated sheet which is to be united to the gunwale of the boat, such plain sheet being cut a little longer than the corrugated sheet, over the ends of which it projects as a flange at either end. These flanges I turn over the open ends of the corrugated sheet, and with the aid of solution fix them there, and thus (or by means of laying over the open ends separate strips of "insertion" ru I cause each several corrugation to become an air-tight cell, and then the puncturing of any one of such air-tight corrugations does not affect the air-tightness of any other of such corrugations. The corrugations, as will be seen by Fig. 12, are arranged horizontally, and the sheets of material are attached to the boat by metal washers (which are placed between the corrugations) and copper nails or screws, as indicated. As will be seen, the material is attached from stem to stern round the gunwale of the boat, forming a kind of continuous molding on both sides; but such molding is composed of separate and distinct longitudinal sections of, say, three feet long by four to twelve inches in breadth, so that the puncturing of any one of such air-tight corrugations will only affect the air-tightness and consequent buoyancy of that one particular corrugation for its own length, while it would notwithstanding still retain its full efficacy as a fender equally and in common with all the other corrugations embraced in such molding, as they each and all depend for their power of resistance upon their original formation only, my rendering them also air-tight being for purposes of buoyancy only, and for the extra buoyancy with extra sea-worthiness, which they also thus give to the boat, in addition to the protection from being stove in, to effect which is my primary object.

In uniting a flat sheet to a corrugated sheet I withdraw one of the twin molds from the corrugated sheet before the process of vulcanization has been completed, keeping it still in the form by the other half-mold, and having smeared over with solution the upper or uncovered corrugated surface of such partly-vulcanized sheet, I then lay the flat rubber sheet over it, (or the strips transversely, as the case may be,) followed by a flat sheet of iron, in lieu of the half-mold which I had removed, and then submit the whole to the final process of vulcanization; but these methods are well known in the rubber trade, as is also the method of joining vulcanized rubber by the interposition of linen, cotton, or such like textures, and of the aid of solution, by the application of which several methods I am also enabled to join different corrugated sheets together, so as, when desirable, from several such sheets made from a single pair of molds of, say, three feet by three feet, to make, for instance, an undivided floor-covering of any required dimensions.

The closeness of the corrugations together, their height, and the number of them to a given area, together with the thickness of the sheet of rubber used in their construction, will vary according to the object desired to be attained. Thus, where much rigidity and resistance is desired, the corrugations will be closer together, more numerous to a given area and depth of pattern, and the thickness and weight of the sheet itself will be greater than where a weaker or more sensitive spring or more elastic surface is desired. In the latter case the corrugations would be higher, less numerous to a given area and depth of pattern, and consequently of a wider span, and the sheet itself would be thinner and lighter.

Where my corrugated material is to be used in stables as a substitute for straw litter, I cover so much of the flooring of the stall or box as may be required to form a bed for the animal, composed of several mats united together by interlocking or any other convenient method, the corrugations forming channels for conveying the urine toward the stable-drains, the several mats composing the bed being respectively arranged so that their corrugations shall run in the proper direction to accomplish such object, having regard to the slope of each particular stall or box, as is illustrated by Figs. 13 and 14, the former showing my disposition of the laying down of the corrugated mats in the case of a stall drained from the center of such stall, and with a fall to such central drain from the floor at all other parts of such stall, and the latter showing my disposition of the corrugated mats in the case of another stall drained at the posterior of a horse's standing position in it, and with a fall from the floor at all other parts of said stall to such posterior drain. These corrugated mats may be taken up daily and washed and the floor of the stall or box swept and cleaned and the mats replaced on the floor, as when required as bedding in lieu of the ordinary straw or litter, which I thus supersede with many obvious advantages—such as, for instance, sanitation, economy of labor and of room occupied in the stowage of straw, (especially in the center of large towns and on board of ocean steamers,) the saving of risks from fire, &c.

Having described the nature of my invention, what I claim is—

As an article of manufacture, corrugated sheets of india-rubber and the compounds of india-rubber, substantially as described.

The above specification of my invention signed by me this 17th day of August, 1880.

DAVID GAUSSEN.

Witnesses:
 WM. CLARK,
 T. W. KENNAD.